United States Patent Office 2,767,229
Patented Oct. 16, 1956

2,767,229

STABILIZING DRYING OILS

Anthony H. Gleason, Westfield, N. J., assignor to Esso Research and Engineering Company, a corporation of Delaware No Drawing. Application February 26, 1953,
Serial No. 339,163

9 Claims. (Cl. 260—669)

This invention relates to the preparation of synthetic drying oils and relates more particularly to a method for improving the handling and processing characteristics of hydrocarbon drying oils and for stabilizing the viscosity of these oils after processing.

It is known that butadiene and styrene can be co-polymerized in proportions of 75 to 85 parts of butadiene to 25 to 15 parts of styrene, preferably 80 parts of the former to 20 parts of the latter, in the presence of metallic sodium to give superior drying oils.

The polymerization is carried out in a reaction diluent at temperatures ranging from about 25° C., to 95° C., i. e., below the melting point of the metal catalyst; temperatures between 40° C., and 85° C., are particularly preferred. As a polymerization catalyst about 1.0 to 5 parts, preferably 1.5 to 3 parts, of finely divided sodium per 100 parts of monomers is used.

Materials used as diluents in the polymerization are preferably liquid at the polymerization temperature, that is, they boil between about 20° C., and 200° C., although more volatile materials boiling as low as −15° C., may be used also, providing that the polymerization pressure is increased correspondingly. Preferred diluents are essentially aliphatic hydrocarbons such as solvent naphtha (boiling range about 90° C., to 120° C.) or straight run mineral spirits such as "Varsol" (boiling range about 150° C. to 200° C.), but butane, pentane, benzene, toluene, xylene, cyclohexane or similar inert hydrocarbons are also suitable, individually or in admixture with each other. In general, the aromatic solvents are not so desirable as to the aliphatic ones because of the toxicity of the former in subsequent use of the product. The hydrocarbon diluents are used in amounts ranging from 100 to 500, preferably 200 to 300 parts per 100 parts of monomers.

An ether, such as dioxane, is usually added to the feed to insure a colorless final product and to act as a reaction promoter. A small amount of an alcohol, such as isopropanol, is also added to the feed as a catalyst activator and viscosity regulator.

The following typical recipe will illustrate the preferred method of preparing the drying oil: 80 parts of butadiene-1,3, 20 parts of styrene, 200 parts of straight run mineral spirits boiling between 150 and 200° C., 40 parts of dioxane, 0.2 parts of isopropanol and 1.5 parts of finely dispersed sodium are heated at about 50° C., in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. Excess of acid is preferably neutralized with anhydrous ammonia. The colorless filtrate is then fractionally distilled to remove the alcohol and dioxane. Finally, additional hydrocarbon solvent is preferably distilled off until a product containing about 50%–95% non-volatile matter is obtained, the non-volatile matter being a drying oil having an intrinsic viscosity of 0.05 to 0.6 and preferably between 0.07 to 0.4.

The drying oil thus obtained may be heat-bodied with or without the addition of maleic anhydride as disclosed in Serial No. 102,703, filed July 1, 1949, now Patent No. 2,652,342, Serial No. 106,487, filed July 23, 1949, now Patent No. 2,683,162, and Serial No. 176,772, filed July 29, 1950, now Patent No. 2,672,425. Maleic anhydride in concentrations of 0.2 to 1.5% is a heat bodying agent only if peroxides are present as described in application Serial No. 312,282, filed September 29, 1952. Without peroxides the heat bodying is performed at 200–250° C., whether the anhydride is present or not. If peroxides are added, temperatures of 100–175° C. are preferred. Suitable peroxides include benzoyl peroxide, cumene hydroperoxide, acetyl peroxide, b-butyl hydroperoxide, and its esters, such as t-butyl perbenzoate, methyl ethyl ketone peroxide, t-butyl peroxide and bis (t-butyl peroxy) butane. The peroxides are added in amounts between 0.05% and 1%. When the oil is to be heat bodied, it is synthesized to a viscosity lower than the one eventually desired and subsequently heat bodied under the specified conditions to the final viscosity. This results in a substantial improvement in drying properties and film flexibility as compared with a drying oil synthesized directly to the desired final viscosity.

In addition to these effects, the heat-bodied oil often increases in viscosity after the heating has been stopped. This is particularly noticeable if metallic driers are added. This increase in viscosity may be due to the fact that active polymerization centers may be generated during the heating operation which persist after the heating stops, although they apparently function at a much slower rate.

It has now been found that these difficulties can be overcome by adding an inhibitor to the drying oil. In simple heat bodying with or without maleic anhydride addition, it is particularly important that the inhibitor be added to the oil prior to stripping and bodying. However, if peroxides are used as bodying agents as described in application Serial No. 312,282, the inhibitor must not be added until after the oil has been bodied. In the first case when no peroxides are present, it is very difficult to secure reproducibility in post synthesis operations unless the inhibitor is added prior to the stripping and/or bodying. Thus, the inhibitor serves two purposes: (1) it serves to prevent viscosity increase of the product on standing and (2) to make post synthesis operations reproducible.

Broadly the invention consists in the steps of preparing a reactive mixture of the butadiene, styrene, isopropyl alcohol, dioxane and hydrocarbon diluent in the desired proportions, as described in Serial No. 134,714, filed December 23, 1949. To this mixture is added a slurry of the sodium catalyst in mineral spirits or other hydrocarbon liquid. The polymerization starts after an hour or so and is allowed to proceed for five to six hours at about 50° C. or until the reaction is complete. Anhydrous acetic acid is then added to this product to completely destroy all catalyst by converting it to an easily filtrable salt. The excess acid is neutralized with ammonia gas and the mixture then filtered, preferably in the presence of a filter aid such as fuller's earth, to separate out the salts. The ammonia is then removed from the filtered product by distillation. The dioxane, alcohol and some diluent are also removed as a side stream in this distillation step. At this point the desired antioxidant (provided the subsequent heat bodying step is not carried out in the presence of peroxides) is added to the concentrated oil. Generally, it is desirable to carry out the distillation and/or stripping so that a product containing about 50–75% non-volatile matter is obtained. This material is a clear, colorless varnish composition having a viscosity between about 0.3 and 10 poise at 50% non-volatile matter.

The heat bodying step is carried out (in the presence or absence of 0.05 to 5% maleic anhydride or other adduct forming reagents) at a temperature between 180° C. and 275° C., preferably between 200° and 250° C. The temperature employed is dependent on the rate of bodying desired and the degree of dilation of the copolymer.

It is particularly important that the inhibitor be added to the oil prior to stripping and bodying. In such cases when the inhibitor is absent, it is very difficult to secure reproducibility in post synthesis operations. For example, the rate of heat bodying with or without maleic anhydride is far more reproducible in the presence of the inhibitors. This is also true when forming the maleic anhydride adduct without bodying (180–200° C.).

Suitable inhibitors which are added to the oil in accordance with this invention include alkylated phenols and bisphenols. Particularly suitable are 2,4,6-trialkyated phenols such as 2,4,6-tritertiary butyl phenol, 2,6-ditertiary butyl, 4-methyl phenol and ditertiary butyl hydroquinone. Effective concentrations are usually on the order of 0.01 to 0.2 based on the polymer, although larger amounts of up to 0.30% may be used without any appreciable influence on the drying or baking rates of the films formed from the oil.

The advantages of the invention will be better understood from a consideration of the following experimental data which are given for the sake of illustration, but without intention of limiting the invention thereto.

*Example I*

A polymer oil having a viscosity of 2.4 poises at 50% N. V. M., was prepared in accordance with the typical recipe described above and reacted with 0.5, 1% and 1.5% of maleic anhydride with and without bodying. The oily product obtained was allowed to stand in full and half-full cans for periods of time varying from about three weeks to over a year in the presence of 0.01% of 2,6-ditertiary butyl, 4-methyl phenol. The increase in viscosity after storage was then determined and the following data were obtained:

the fact that the viscosity increase is greater with half-full cans in the presence of driers than with full cans containing the same driers. Furthermore, in full cans without driers, the increases in viscosity were unimportant and the differences between inhibited samples were relatively small.

The nature of the present invention having been thus fully set forth and specific examples of the same given, what is claimed as new and useful and desired to be secured by Letters Patent is:

1. A process for preparing a drying oil which comprises copolymerizing a mixture of from 75 to 85% of butadiene and 25 to 15% of styrene in 200 to 300 parts of a hydrocarbon diluent per 100 parts of monomers and 20 to 30 parts of a member of the group consisting of aliphatic ethers of 4 to 8 carbon atoms and cyclic diethers of 4 to 8 carbon atoms, in the presence of 1 to 5 parts of finely divided sodium at a temperature between 40 and 85° C., continuing the polymerization until substantially 100% conversion is reached and a product having an intrinsic viscosity between 0.05 and 0.4 is obtained, stopping the polymerization by killing and removing the catalyst and then heat bodying the product at a temperature between 150° and 275° C., in the presence of 0.001 to 0.3% of an alkylated phenol.

2. Process according to claim 1 in which the alkylated phenol is 2,6-ditertiary butyl, 4-methyl phenol.

3. Process according to claim 1 in which the alkylated phenol is tritertiary butyl phenol.

4. Process according to claim 1 in which the alkylated phenol is ditertiary hydroquinone.

5. A process for preparing a drying oil which comprises copolymerizing a mixture of from 75 to 85% of butadiene and 25 to 15% of styrene in 200 to 300 parts of a hydrocarbon diluent per 100 parts of monomers and 20 to 30 parts of a member of the group consisting of aliphatic ethers of 4 to 8 carbon atoms and cyclic diethers of 4 to 8 carbon atoms, in the presence of 1 to 5 parts of finely divided sodium at a temperature between 40 and 85° C., continuing the polymerization until substantially 100% conversion is reached and a product having an intrinsic viscosity between 0.05 and 0.4 is obtained stopping the polymerization by killing and removing the catalyst and then heat bodying the product at a temperature between 100 to 175° C., in the presence of .05 to 1% of an organic peroxide until the desired vis-

*Table I*

| Percent M. A. | Inhibitor | Viscosity [a] of oil in full can + driers [b] | | | Viscosity [a] of ½ full can + driers [b] | | | Viscosity [a] of ½ full cans, no driers | | |
|---|---|---|---|---|---|---|---|---|---|---|
| | | As Synthesized | After heating with M. A. | After Storage X days ( ) | As Synthesized | After heating with M. A. | After Storage X days ( ) | As Synthesized | After heating with M. A. | After Storage X days ( ) |
| 0.2 | No | 2.4 | 5.0 | 11.8 (51) | | | | | | |
| 0.2 | Yes [c] | 2.4 | 7.5 | 8.8 (51) | | | | | | |
| 0.5 | No | 2.4 | 4.8 | 16 (52), gel (295) | 2.4 | 4.8 | 31.6 (52) | | | |
| 0.5 | Yes | 2.4 | 6.3 | 7.3 (52), 9.0 (295) | 2.4 | 6.3 | 10 (52) | | | |
| 1.0 | No | | | | 2.4 | 2.4 | 13 (128), gel (346) | | | |
| 1.0 | Yes [c] | | | | 2.4 | 2.4 | 4.0 (128), 5.0 (346) | | | |
| 1.0 | No | 2.4 | 6.3 | 58 (52) | 2.4 | 6.3 | Gel (21) | 2.4 | 6.6 | 14.1 (398) |
| 1.0 | Yes | 2.4 | 9.5 | 10 (52) | 2.4 | 9.5 | 9.8 (30) | 2.4 | 6.8 | 11.4 (398) |
| 1.5 | No | 2.4 | 2.4 | 5.8 (398) | 2.4 | 2.4 | 19.3 (128), gel (295) | 2.4 | 9.5 | [d]21.4 (398) |
| 1.5 | Yes | 2.4 | 2.4 | 2.5 (398) | 2.4 | 2.4 | 3 (295) | 2.4 | 9.8 | [d]17.6 (398) |

M. A.—maleic anhydride.
[a] All viscosities in poises at 50% N. V. M.
[b] 0.4% lead and 0.04% manganese based on polymer.
[c] The inhibitor in this case was tritertiary butyl phenol.
[d] The inhibitor in this case was ditertiary hydroquinone.

The foregoing data clearly shows that the presence of an inhibitor prevents undue increase in viscosity of polymer oils during prolonged storage. The most outstanding differences in viscosity stability are apparent when driers are present, thus indicating that oxygen plans an important role in the increase in viscosity. This is confirmed by cosity is obtained and then adding 0.001 to 0.3% of an alkylated phenol.

6. Process according to claim 5 in which the alkylated phenol is 2,6-ditertiary butyl, 4-methyl phenol.

7. Process according to claim 5 in which the alkylated phenol is tritertiary butyl phenol.

8. Process according to claim 5 in which the alkylated phenol is ditertiary hydroquinone.

9. A viscosity stable drying oil, prepared by copolymerizing 75 to 85 parts of butadiene and 25 to 15 parts of styrene in 150 to 500 parts of a hydrocarbon diluent per 100 parts of monomers and 20 to 30 parts of a member of the group consisting of aliphatic ethers of 4 to 8 carbon atoms and cyclic diethers of 4 to 8 carbon atoms in the presence of 1 to 5 parts of finely divided sodium at a temperature between 50 and 85° C., and containing 0.001 to 0.3% of an alkylated phenol selected from the group consisting of 2,4,6-trialkylated phenols and ditertiary butyl hydroquinone.

References Cited in the file of this patent

UNITED STATES PATENTS

| | | |
|---|---|---|
| 1,832,450 | Ebert et al. | Nov. 17, 1931 |
| 2,559,947 | Crouch | July 10, 1951 |
| 2,581,907 | Smith et al. | Jan. 8, 1952 |
| 2,631,175 | Crouch | Mar. 10, 1953 |
| 2,701,780 | Nelson et al. | Feb. 8, 1955 |